United States Patent [19]
Visconti

[11] Patent Number: 4,984,815
[45] Date of Patent: Jan. 15, 1991

[54] STEERING DEVICE FOR A MOTOR VEHICLE WITH FOUR STEERED WHEELS

[75] Inventor: Marco Visconti, Bollate, Italy

[73] Assignee: Alfa Lancia S.p.A., Arese, Italy

[21] Appl. No.: 387,157

[22] Filed: Jul. 31, 1989

[30] Foreign Application Priority Data

Aug. 4, 1988 [IT] Italy .................... 21651 A/88

[51] Int. Cl.$^5$ .................................. B62D 7/00
[52] U.S. Cl. ........................ 280/91; 180/140
[58] Field of Search ............ 280/91, 96; 180/140

[56] References Cited

U.S. PATENT DOCUMENTS

| | | | |
|---|---|---|---|
| 4,163,566 | 8/1979 | Tapp | 280/91 |
| 4,522,416 | 6/1985 | Sano et al. | 280/91 |
| 4,522,417 | 6/1985 | Sano et al. | 280/91 |

FOREIGN PATENT DOCUMENTS 2511329 2/1983 France.
2130986 6/1984 United Kingdom.
2188600 10/1987 United Kingdom.

Primary Examiner—Kenneth R. Rice
Attorney, Agent, or Firm—Charles E. Brown; Charles A. Brown

[57] ABSTRACT

In the proposed steering device a drive shaft is operationally connected to the front wheel steering mechanism and to a driven shaft by way of motion step-down means; the two shafts are provided with respective cranks, and with respective pins which engage in a link element operationally connected to steering levers for the rear wheels.

7 Claims, 4 Drawing Sheets

STEERING DEVICE FOR A MOTOR VEHICLE WITH FOUR STEERED WHEELS

The invention relates to a steering device for a motor vehicle with four steered wheels, which is able to vary the size and direction of the steering angle of the rear wheels relative to the steering angle of the front wheels as a function of the angle of rotation of the steering wheel.

In motor vehicles with conventional steering devices applied only to the front wheels, lateral guide forces directed towards the interior of the curve are generated between the obliquely-disposed front wheels and the ground on turning the steering wheel. These forces give rise to a yawing torque which causes the motor vehicle to turn about its barycentre and start to change its direction.

The rear wheels, which are aligned with the vehicle body, then also change direction so that respective lateral forces are generated between the rear wheels and the ground, by virtue of which the vehicle is able to undergo controlled direction change. Thus, after the transient curve-initiation stage the vehicle begins to take the curve under stable conditions, and follow the required path.

Consequently, a motor vehicle begins to move uniformly along a curve only with a certain delay after the turning of the steering wheel.

This delay, due to the fact the lateral guide forces on the rear wheels are generated after those acting on the front wheels, is inevitable if the rear wheels remain aligned with the vehicle body and are unable to change direction relative to this body simultaneously with the front wheels.

These considerations have led to the development of so-called integral steering devices which enable both the front wheels and rear wheels to be steered so that the lateral guide forces can arise simultaneously on all four vehicle wheels. Generally the known devices, which are mechanical, hydraulic or electrical, are structured so that the rear wheels are steered in phase with, is in the same direction as, the front wheels for small steering wheel turning angles and medium and high vehicle speeds.

The result is that the vehicle becomes easier to handle because its directional stability is increased.

With many of the known devices the rear wheels are steered in couterphase with, ie in the opposite direction to, the front wheels for large steering wheel turning angles and low vehicle speeds.

This improves the manoeuvrability of the vehicle during parking because it reduces the minimum steering radius.

In most cases, the known devices are however rather complicated and bulky, hardly flexible and not without operational criticism. The object of the present invention is to provide an integral steering device which is of simple construction, reliable and safe in operation, and easily adapted to different performance requirements.

The device according to the invention comprises at least one drive shaft rotatably supported in the motor vehicle body and operationally connected to the front wheel steering mechanism by first motion transmission means, and to steering levers for the vehicle rear wheels, the device being characterised in that said drive shaft is connected by second motion transmission means to a driven shaft, each of the two shafts being provided with an eccentric pin engaged with a link element which is operationally connected to said rear wheel steering levers.

Preferably said motion transmission means are formed from a pair of motion step-down gearwheels, one rigid with the drive shaft and the other rigid with the driven shaft, and in mutual engagement. According to a preferred embodiment, said link element is connected at one end by a third pin to a rod supported in an axially slidable manner in the vehicle body and mechanically connected to said rear wheel steering levers.

With the device according to the invention it is possible to simultaneously steer the front wheels and rear wheels so that for small steering wheel turn angles said wheels are orientated in the same direction or in phase, whereas for large steering wheel turn angles the rear wheels assume an opposite or counterphase orientation relative to the front wheels.

The device is constructionally very simple and is safe in operation.

Characteristics and advantages of the invention are described hereinafter with reference to FIGS. 1 to 6 which show a preferred embodiment of the invention by way of non-limiting example.

Figure 1:
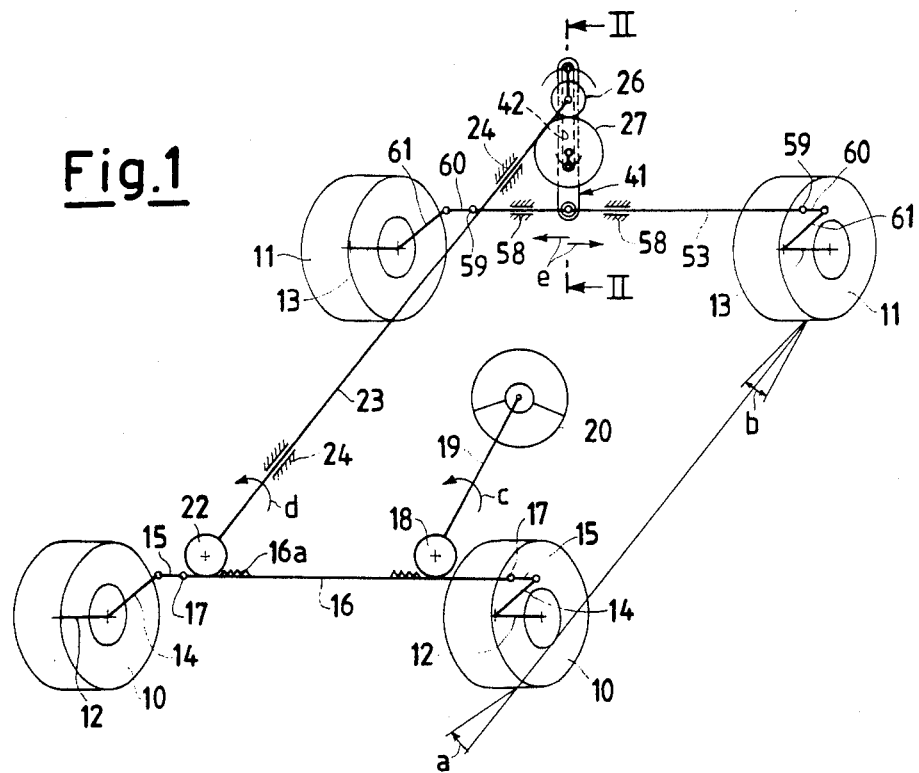
FIG. 1 is a diagrammatic representation of an integral steering device according to the invention.

FIG. 1 shows the front wheels 10 and the rear wheels 11 of a motor vehicle. The reference numerals 12 and 13 indicate the wheel axes, the figure not showing the suspensions which connect the hub assemblies of the wheels 10 and 11 to the vehicle body, which is also not shown.

The steering mechanism for the front wheels 10 comprises the steering levers 14 fixed to the hub assemblies of the wheels 10 and hinged to the later tie bare 15, which are connected by ball joints 17 to the rack 16.

The rack 16 is supported axially slidable in the vehicle body and engages a pinion 18 rigid with the steering column 19 and steering wheel 20.

Suitable toothing 16a of the rack 16 also engages a gearwheel 22 to obtain a desired step-down ratio. The gearwheel 22 is rigid with a longitudinal drive shaft 23 which is rotatably supported at 24 in the vehicle body.

Figure 2:
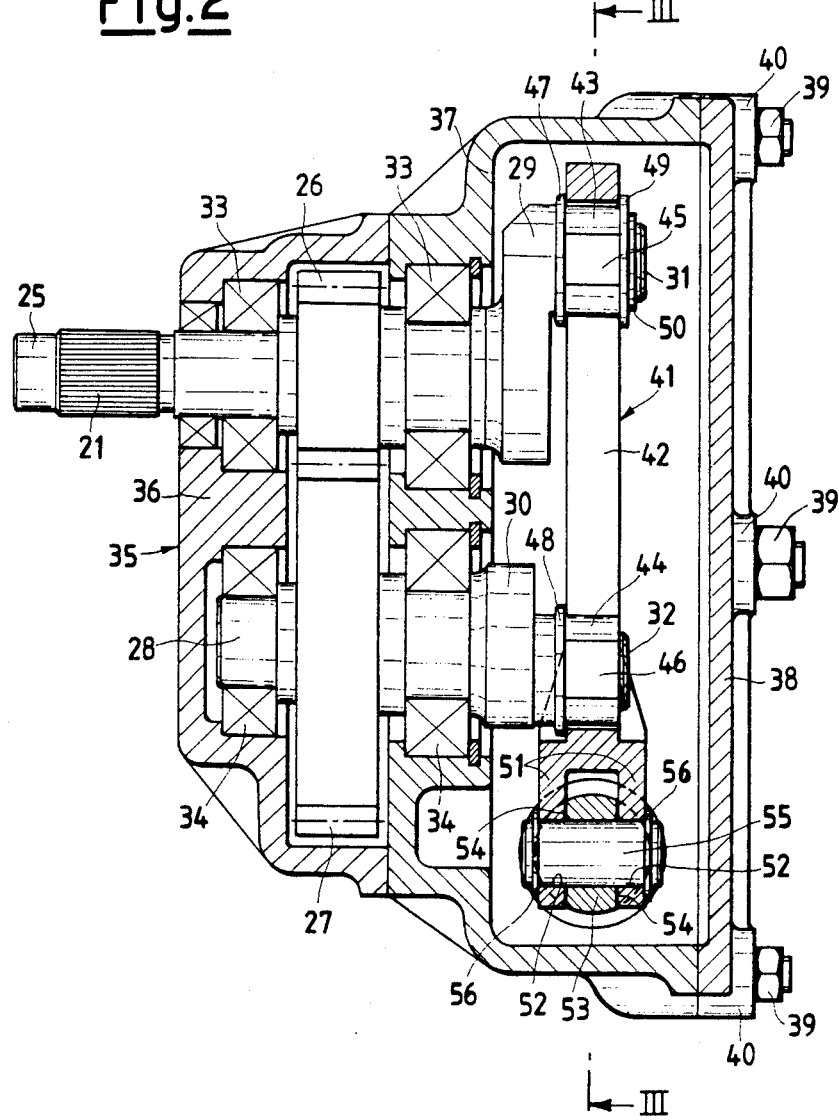
FIG. 2 is an enlarged longitudinal section through a detail of the device on the line II—II of FIG. 1, with some components shown in full view for greater clarity.

A further drive shaft 25, clearly visible in FIG. 2, is made rotatably rigid with the drive shaft 23 by means of splines 21. A pinion 26 is rigid with the drive shaft 25 and engages a gearwheel 27 rigid with a driven shaft 28. A step-down motion transmission is therefore formed between the shafts 25 and 28.

Cranks 29 and 30 are rigid with the shafts 25 and 28 and are provided at their ends with pins 31 and 32, these therefore being eccentric to said shafts 25 and 28. Specifically, the pins 31 and 32 have different eccentricities with respect to the axes of their shafts 25 and 28, the pin 31 associated with the drive shaft 25 having a greater eccentricity than the pin 32 associated with the driven shaft 28, the crank 29 therefore having a greater crank radius than the crank 30.

The shafts 25 and 28 are rotatably supported by rolling-contact bearings 33 and 34 in a casing, indicated overall by 35, which is fixed to the vehicle body.

Figure 3:
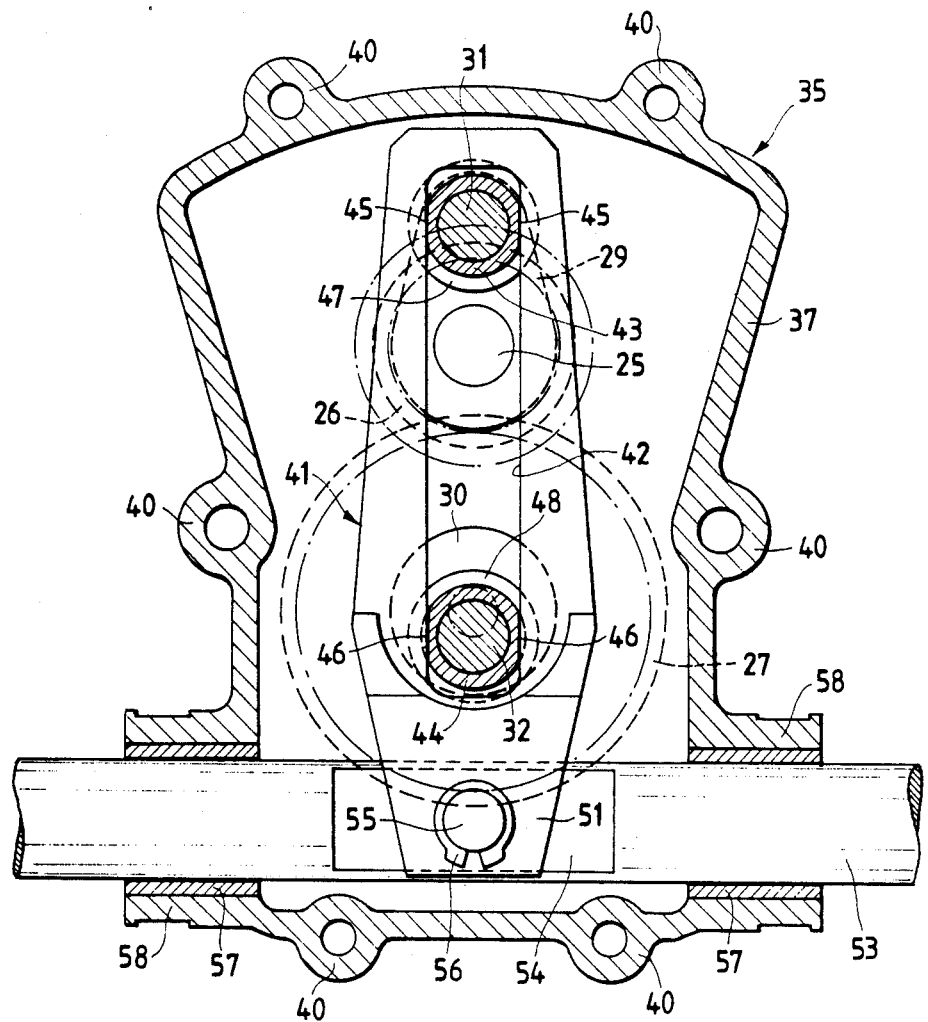
FIG. 3 is a section through the same detail on the line III—III of FIG. 2, with some components shown in full view for greater clarity.

The casing 35 is formed from a cap 36, a substantially annular wall 37 and a cover 38, which are fixed together by bolts such as those indicated by 39 in FIG. 2, passing through bored lugs such as those indicated by 40 in FIG. 3.

The reference number 41 indicates a link element provided with a substantially rectangular slot 42 with which the pins 31 and 32 slidingly engage by way of respective bushes 43 and 44. Each bush 43 and 44 comprises externally a pair of flat faces 45 and 46 respectively, visible in FIG. 3, which form sliders for guiding the axial sliding of the pins 31 and 32 in the slot 42 of the link element 41.

The reference numerals 47 and 48 indicate spacers formed integrally with bushes 43 and 44, the reference number 49 indicating a further spacer and 50 a snap ring which axially retains the pin 31 in the slot 42.

The link element 41 is provided at one end with two arms 51 containing holes 52. A rod 53 is gripped between the two arms 51, and for this purpose comprises two external flat opposing faces indicated by 54.

A pin 55 axially retains the rod 53 between the two arms 51 by means of two snap rings 56.

The rod 53 is supported so that it can slide axially, by way of plain bearings 57, in tubes 58 rigid with the annular wall 37 of the casing 35, as shown in FIG. 3.

As shown in FIG. 1, the rod 53 is connected by ball joints 59 to tie bars 60 which are pivoted to steering levers 61 fixed to the hub assemblies of the rear wheels 11.

When the motor vehicle enters the curve, the driver turns the steering wheel 20, for example to the right in the direction of the arrow c of FIG. 1, or to the left, according to the direction of the curve, and correspondingly the front wheels 10 steer in the same direction of rotation as the steering wheel 20. The relationship between the angle of rotation of the steering wheel 20 and the steering angle of the wheels 10 depends on the step-down ratio between the pinion 18 and rack 16.

Figure 4:
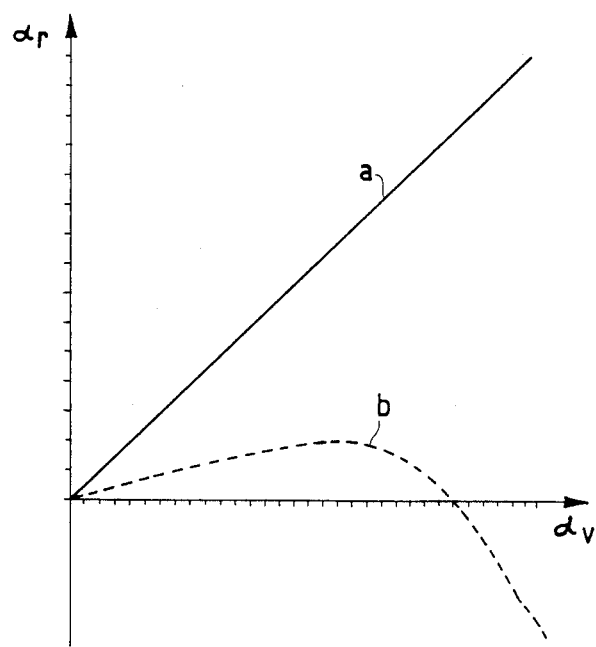
FIG. 4 is a graphical representation of the variation in steering angles obtainable with the device of FIG. 1.

In the diagram of FIG. 4, in which the horizontal axis represents the angle of rotation of the steering wheel 60 and the vertical axis represents the steering angle 60 of the wheels, the straight line "a" shows indicatively how the steering angle of the front wheels 10 varies with the angle of rotation of the steering wheel 20.

This steering angle can reach a maximum of 30°, for a steering wheel rotation angle of about 600°.

With the described device, movements of the rack 16 result in corresponding rotations of the drive shafts 23 and 25 (in the direction of the arrow d if the steering wheel is turned in the direction of the arrow c) and, in the opposite direction, of the driven shaft 28. The consequent angular movements of the respective cranks 29 and 30 and of their pins 31 and 32 induce oscillations of the link element 41 and consequent sliding of the rod 53 about its neutral position (arrow e).

The curve "b" of FIG. 4 shows the relationship between the steering angle of the rear wheels 11 and the steering angle of the front wheels 10.

Specifically, the rear wheels 11 are made to steer in phase with, ie in the same direction as, the front wheels below a predetermined angle of rotation of the steering wheel, for example 360°, whereas said rear wheels 11 are made to steer in counterphase with, ie in the opposite direction to, the front wheels above said predetermined angle of rotation of the steering wheel 20.

This steering angle can attain a maximum of 2°-4° in phase for a steering wheel rotation angle of about 360°, whereas it can reach a maximum of 5°-10° in counterphase for a steering wheel rotation angle of about 600°.

In FIG. 3 the link element 41 is shown in its neutral position with the steering wheel 20 also in the neutral position. Their relative positions are set using suitable reference marks, not shown.

Figure 5:
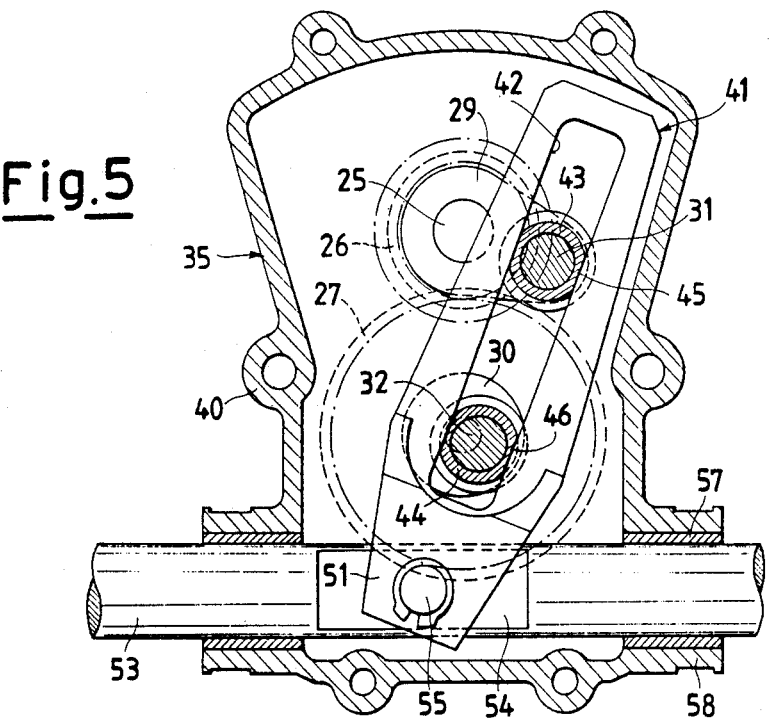
FIG 5 and 6 are views similar to that of FIG. 3 but to a smaller scale and with the link element in tis respective maximum travel positions.
Figure 6:
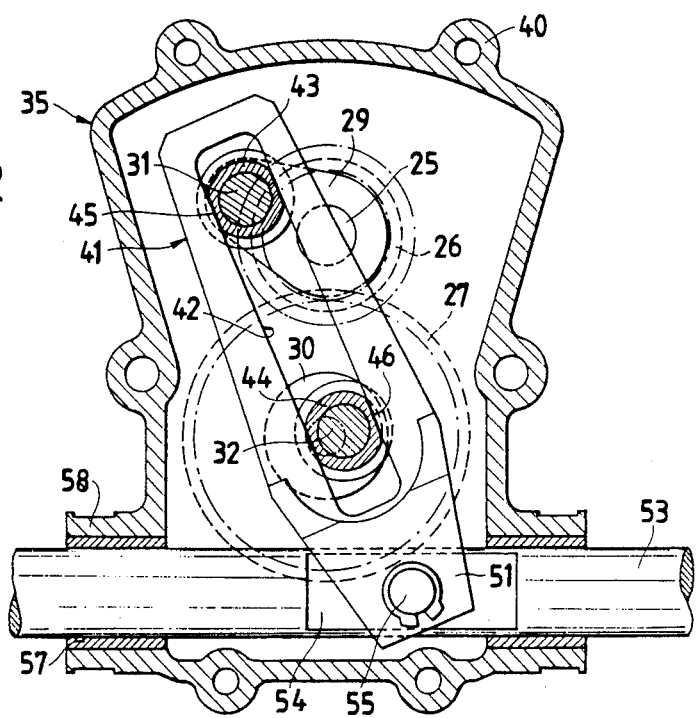

The link element 41 is shown in FIG. 5 in its position of maximum phase travel from its neutral position, and in FIG. 6 in its position of maximum counterphase travel from its neutral position.

The illustrated device is of very simple construction and is particularly reliable and safe in operation. It will be apparent that the illustrated device is easily adapted to different performance requirements, in that different relationships between the rear wheel steering angle and the front wheel steering angle can be obtained by varying the step-down ration between the shafts 25 and 28, and/or providing cranks 29 and 30 with different crank angles.

I claim:

1. A steering device for a motor vehicle having a body with steered front and rear wheels, said steering device comprising at least one drive shaft (25) rotatably supported in the motor vehicle body and operationally connected to the steering mechanism (16, 18) for the front wheels (10) by first motion transmission means (16a, 22) and to steering levers (61) for the vehicle rear wheels (11), said drive shaft (25) being connected by second motion transmission means (26, 27) to a driven shaft (28), each of the two shafts (25, 28) having an axis and being provided with a respective eccentric pin (31, 32), each pin (31, 32) being slidably and rotatably engaged with a link element (41) which is operationally connected to said steering levers (61) for the rear wheels (11), and said link element (41) having a substantially rectangular slot (42) with a length along which each pin (31, 32) slides.

2. A steering device as claimed in claim 1, wherein said second motion transmission means (26, 27) are formed from a pair of step-down gearwheels, one (26) rigid with the drive shaft (25) and the other (27) rigid with the driven shaft (28), and in mutual engagement.

3. A steering device as claimed in claim 1, wherein the eccentric pins (31, 32) are disposed with different eccentricity about the axis of their respective shafts (25, 28).

4. A steering device as claimed in claim 3, wherein the pin (31) associated with the drive shaft (25) has greater eccentricity than the pin (32) associated with the driven shaft (28).

5. A steering device as claimed in claim 1 wherein said eccentric pins (31, 32) are made rigid with their respective shafts (25, 28) by means of respective cranks (29, 30).

6. A steering device as claimed in claim 1, wherein said pins (31, 32) are engaged in the substantially rectangular slot (42) of the link element (41) by way of respective bushes (43, 44) provided externally with a pair of flat faces (45, 46), to act as guide sliders for said pins (31, 32).

7. A steering device as claimed in claim 1, wherein said link element (41) is provided at one end with two arms (51) which are connected by a third pin (55) to a rod (53) supported in an axially slidable manner in the vehicle body and mechanically connected to said steering levers (61) for the rear wheels (11).

* * * * *